July 17, 1962 M. L. BUUS ET AL 3,044,692

BINOMIAL PROBABILITY CALCULATOR

Filed Oct. 4, 1960 2 Sheets-Sheet 1

INVENTORS
MELVIN L. BUUS,
HAROLD NERHUS
BY
Herbert E. Kidder
AGENT

INVENTORS
MELVIN L. BUUS,
HAROLD NERHUS
BY
Herbert E. Kidder
AGENT

United States Patent Office 3,044,692
Patented July 17, 1962

3,044,692

BINOMIAL PROBABILITY CALCULATOR

Melvin L. Buus, 8832 Sorrento Drive, Arlington, Calif., and Harold Nerhus, 2215 Westport Drive, Anaheim, Calif.

Filed Oct. 4, 1960, Ser. No. 60,470
14 Claims. (Cl. 235—61)

The present invention relates to statistical calculators, and more particularly to a probability calculator for performing various operations in analyzing counted data of a binomial nature.

The statistical analysis of binomial data deals with dichotomous populations, which can be classified into only two mutually exclusive classes, such as reliable or unreliable, successful or failure, plus or minus etc. For example, in tossing a coin, the number of times that the coin comes up heads in a given number of tosses would be counted as so many successes, while the number of times that the coin comes up tails would be counted as so many failures. Likewise, in acceptance sampling for quality control, the number of acceptable items in a sample would be counted as so many successes, while the number of defective items would be counted as so many failures.

In most cases, it is possible to determine the probability of success by merely finding the ratio of success to sample size. Many times, the probability calculated from a small number of trials may lead to an erroneous picture of the probability of success of the rest of the trials. For example, when tossing a coin, if heads appeared eight out of ten times, one might incorrectly conclude that heads will appear eighty percent of the time, if it were not known that the probability of success of a single trial is fifty percent. Similiarly, in appraising the reliability of a missile which has succeeded eight times in ten attempts, it would be erroneous to conclude that the missile would be successful eighty percent of the time, owing to the small size of the sample tested.

In any type of statistical analysis using enumerated data, it will be obvious that the larger the sample, the more reliable the conclusions. However, it is possible to predict certain results even with a relatively small sample, by taking into account the size of the sample and the desired accuracy of the prediction. For example, frequently it is of interest to find, not the exact or best estimate of probability of some sample size, but rather, to determine some interval $P_1$—$P_2$ that has a certain (e.g., 95% confident) probability of including the universe value. This interval is defined as the confidence interval, and the end values of the interval are called confidence limits. The size of the confidence interval is a function of sample size, number of successful trials, and the degree of confidence desired. Heretofore, such statistical analysis has been accomplished either by use of tables, or by plotting the data on binomial probability paper, or by use of data processing machines.

The term "universe value," as used above, refers to the true value that would be obtained if all items in the population were tested. If it were possible to examine 100% of a very large population, the conclusions reached by such a test would be virtually 100% accurate and would constitute the universe value. However, it is seldom possible to make such an exhaustive test of a very large population, and the science of statistical analysis of binomial data has therefore been developed to provide reliable conclusions from limited samples. The problem of inductive inference, from the point of view of statistics, is well stated in the "Introduction to the Theory of Statistics" by A. M. Mood, McGraw-Hill 1950, page 126, paragraph 7.2 as follows: "The object of an experiment is to find out something about some specified population. It is impossible or impractical to examine the entire population, but one may examine a part or sample of it, and on the basis of this limited investigation make inferences regarding the whole population.

The primary object of the present invention is to provide a relatively simple binomial probability calculator which can be used to give the desired figures with slide-rule speed and approximations, and which also presents the statistical results in a visual manner.

Another object of the invention is to provide a binomial probability calculator which is extremely versatile, and capable of solving problems relating to sign test, F tests, tolerance limits, observed and theoretical proportions, sample size, etc., with ease and a high degree of accuracy.

Still a further object of the invention is to provide a binomial probability calculator that is inexpensive and relatively simple to use, even by inexperienced operators.

These and other objects and advantages of the present invention will become apparent to those skilled in the art upon consideration of the following detailed description of two illustrative forms thereof, reference being had to the accompanying drawings, wherein.

Figure 1:
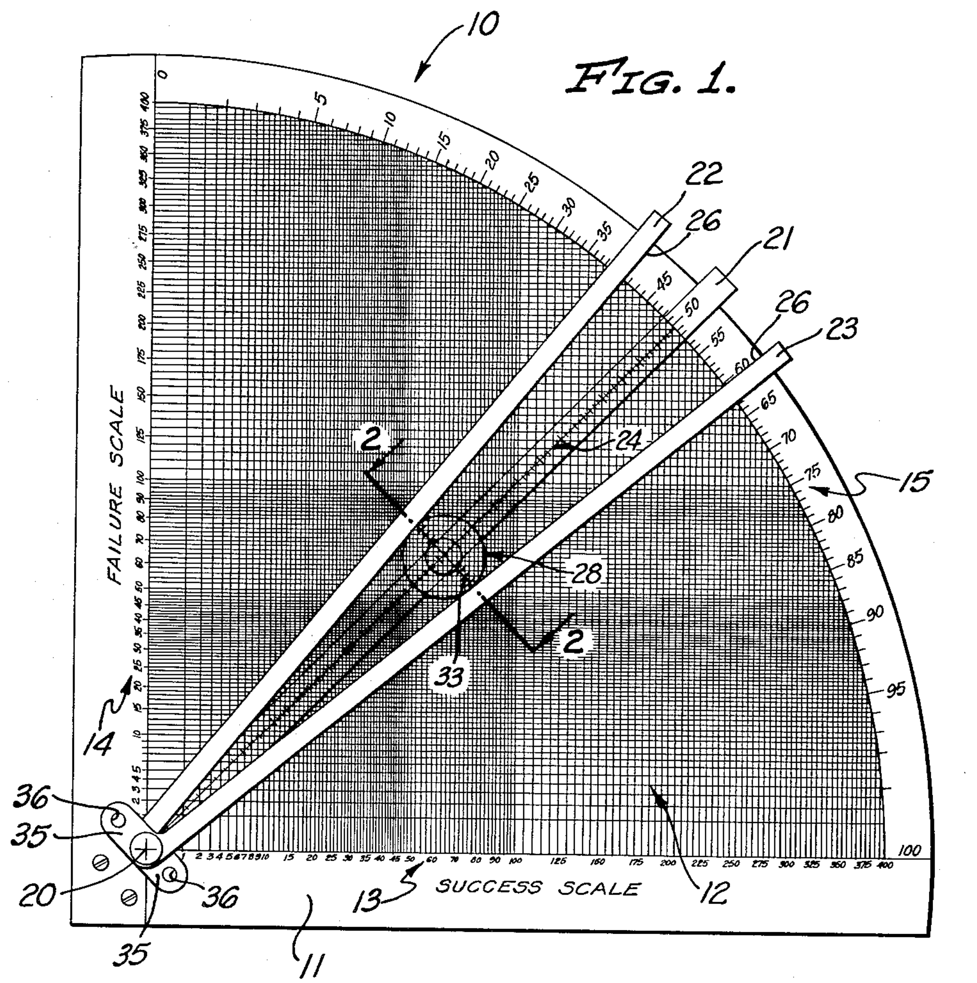
FIGURE 1 is a top plan view of a binomial probability calculator embodying the principles of the invention.
Figures 2, 3:
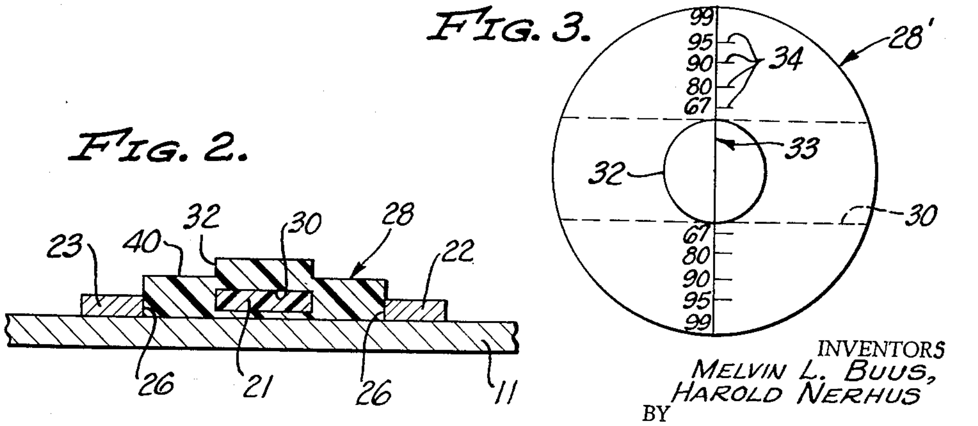
FIGURE 2 is an enlarged fragmentary sectional view, taken at 2—2 in FIGURE 1.
FIGURE 3 is an enlarged elevational view of the circulator disc that goes on the center arm of the calculator, the disc in this case being of a radius to give 99% confidence limits.

In FIGURES 1 and 2 of the drawings, the binomial probability calculator of the present invention is designated in its entirety by the reference numeral 10, and comprises a plate 11 having a square root grid 12 provided on the surface thereof, with scale graduations 13 ranging from zero to 400 along the horizontal axis, and similar graduations 14 ranging from zero to 400 along the vertical axis thereof. The two scales 13 and 14 are identical in spacing and in length, being preferably 10 inches long, which is a convenient size for easy reading. The "400" figure for the top of the scales is an arbitrary figure, selected primarily for use with sample sizes ranging from zero to 400.

The two scales 13 and 14 are marked off for the number of units counted in each of the two groups of the sample; scale 13 representing the number of successes, while scale 14 represents the number of failures. The spacing between graduations changes as the distance from the origin changes, and the distance from the origin to a coordinate is the square root of the digital value of the coordinate—hence the name "square root grid." Thus coordinate "4" is twice the distance from the origin as coordinate "1," while coordinate "9" is three times the distance, and so on. The distance from the origin to coordinate "1" is one-half inch, making the distance from the origin to coordinate "400" exactly 10 inches.

The plate 11 is preferably in the shape of a sector comprising one-quarter of a circle, and the square root grid 12 is bounded on its perimeter by a quadrant scale 15, which is graduated from zero to 100 percent. It will be noted that the zero end of the quadrant scale 15 is at its intersection with the vertical axis, at the left-hand edge of the square root grid 12, which the 100 percent end is at its intersection with the horizontal axis, at the bottom of the grid 12. The graduations of the quadrant scale 15 are such that a straight line through the origin intersects the scale 15 at the percentage of the proportions of the coordinates at all points on the square root grid under the said line. Thus, for example, a straight line through the origin and passing through coordinates (20, 5) also passes through coordinates (40, 10), (80, 20), (160, 40), etc., and intersects the quadrant scale 15 at the 80% mark.

At the intersection of the horizontal and vertical axes of the grid 12, near the lower left-hand corner of plate 11, is a pivot center 20, which may be in the form of a pivot bolt or the like, and swingably supported on this pivot center is a "split" arm 21, and two pointers 22 and 23. The "split" arm 21 is preferably made of transparent plastic so that the graduations on the grid 12 can be seen through it, and ruled down the center of the arm is a line 24, which passes through the pivot center, or origin of the grid 12. In the terminology of binomial probability statistics, a straight line passing through the origin of the coordinates and through a given point on the grid is known as a "split," hence the name "split" arm. Marked off along the line 24 are square root scale graduations ranging from zero to 400, with the zero marked at the pivot center 20, and the "400" mark at the intersection of the quadrant scale 15. Thus, the square root scale graduations on the line 24 are the same as the square root scale graduations 13 and 14, being equal in number and in overall length.

The pointers 22, 23 are disposed on opposite sides of the "split" arm 21, and the two pointers and arm are swingable together or relative to one another over the surface of the plate 11 from one end of the square root grid 12 to the other. The pointers 22, 23 are preferably formed of metal, and their adjacent, or facing edges 26 are straight lines that pass through the pivot center 20. The pointers 22, 23 are normally drawn together against opposite sides of a circular disc 28 on the arm 21, with the straight edges 26 of the pointers tangent to the disc, and this causes the pointers to diverge from the pivot center 20 with an included angle that is a function of the diameter of the disc 28 and its distance from the pivot center.

The circular disc 28 is likewise formed of transparent plastic, so that the graduations on the square root grid 12 can be seen through it. As best shown in FIGURE 2, the disc 28 is provided with a horizontally elongated, rectangular slot 30 which extends diametrically through the disc, and the arm 21 is slidably received within this slot, so that the disc can be moved along the length of the arm. Projecting upwardly from the top side of the disc 28 is a circular boss 32, which is concentric with the disc and of smaller diameter than the latter.

The purpose of this raised circular boss 32 is to provide a disc of smaller diameter which is engageable by the pointers 22, 23 when working with a number larger than the sample for which the disc 28 is designed, i.e., 400 units in the embodiment illustrated herein.

The diameters of the disc 28 and boss 32 are an important element of the invention, and vary with the confidence level. For example, with a square root grid 12 graduated from zero to 400 and measuring 10 inches to a side, the radius of the disc 28 would be .490 inch to give two-sided 95% confidence limits. This .490 inch radius corresponds to 1.96 standard deviations ($\sigma$) where, in the present case, one standard deviation ($\sigma$) equals .25 inch. For other confidence levels, the radius of the disc would be as shown in the following table:

| Significance level, Percent | | Confidence Level, Percent | Standard Deviation | |
|---|---|---|---|---|
| One-sided | Two-sided | | Multiples | Inches Radius |
| 16.5 | 33 | 67 | .97 | .243 |
| 10 | 20 | 80 | 1.28 | .320 |
| 5 | 10 | 90 | 1.65 | .413 |
| 2.5 | 5 | 95 | 1.96 | .490 |
| .5 | 1 | 99 | 2.58 | .645 |

NOTE.—One standard deviation ($\sigma$)=.25".

In each case, the diameter of the smaller circular boss 32 is reduced by a factor of 3.16 from the diameter of the disc 28, the 3.16 factor being the proportional difference in size between the square root scale to 400 and the square root scale to 4000. Thus, in the case of the disc 28 which has a radius of .490 inches for 95% confidence limits, the boss 32 has a radius of .155 inch.

Scribed diametrically across the bottom surface of the disc 28 perpendicular to "split" line 24, as best shown in FIGURE 3, is a cross hair 33 having graduations 34 marked thereon, representing the confidence levels designated by the figures along the left-hand side of the cross hair. The disc 28' shown in FIGURE 3 is identical to the disc 28 in FIGURE 1, except that it is designed for 99% confidence limits, whereas the disc 28 is designed for 95% confidence limits. The distances from the center of the disc to the graduations are the same as the radius dimensions shown in the table.

The pointers 22, 23 have laterally projecting ears 35 extending in opposite directions from their pivoted ends, and each of these ears is apertured at 36 to receive the pivot bolt 20. The spacing of the aperture 36 from the straight edge 26 of the pointer is exactly the same as the radius of the disc 28, and thus the straight edge 26 can be made parallel to the "split" line 24 by passing the pivot bolt 20 through aperture 36 and making the straight edge tangent to the disc 28. This configuration of the calculator is useful for certain types of statistical work.

The operation of the embodiment of our invention shown in FIGURES 1–3 can best be explained by describing its use in a few illustrative examples.

*Example 1*

A rocket motor of a missile has successfully performed in 26 out of 29 tests. The problem is to find the percent success and the 95 percent confidence limits. The cross hair 33 of the circular disc 28 is placed on "29" of the graduations 24, which represents the sample size. The intersection of the cross hair 33 and line 24 are placed over "26" on the horizontal "success" scale 13 and "3" on the vertical "failure" scale 14. The intersection of the line 24 and the quadrant scale 15 gives 85% success. The cross hair 33 is then moved to "30" on the graduations 24, and the intersection of the cross hair 33 and line 24 is placed over the (27, 3) coordinates of the grid 12. The lower pointer 23 is brought against the edge of the disc 28, and the intersection of the straight edge 26 and quadrant scale 15 gives an upper confidence limit of 98%. With the cross hair 33 still at "30" on the graduations 24, the interesction of cross hair 33 and line 24 is placed over the (26, 4) coordinates of the grid. The intersection of the straight edge 26 of upper pointer 22 with quadrant scale 15 gives a lower confidence limit of 73%. The answer to the problem, therefore, is that one can be 95% confident that the rocket motor probability of success is between 73% and 98%, while the demonstrated success rate is 85%.

In this example and in the following, the intersection of the cross hair 33 and line 24 is placed successively over the coordinates on grid 12 that are plotted from a paired count in the usual manner. The term "paired count" refers to the numbers in the sample observed as having and as not having some characteristic. Thus, if a sample of 100 yields 80 successes and 20 failures, the paired count is (80, 20). A paired count is plotted as a right triangle, the vertex being plotted at the observed count (i.e., at 80, 20) and the two sides extending one unit parallel to the horizontal and vertical axes, respectively. Thus, the other two vertices would be (80, 21) and (81, 20). If one or both of the coordinates is larger than 100, the addition of one will not show, and the triangle appears as a short line (one unit long) or as a point.

*Example 2*

A sample of 800 men were asked to express their preference between candidates A and B. Four hundred and seventy preferred A. Assuming random sampling, what can be said about the possibility of A being elected at the 95% confidence interval? Since the sample is larger than 400, the pointers 22 and 23 are lifted up onto the shoulder 40 of the disc 28, so that the straight edges 26 are tangent to the smaller diameter boss 32. The cross hairs 33, 24 are placed over the coordinates (470, 330) as represented by the coordinates (47, 33) of the grid 12, and confidence limits of 55% and 62% are read out where the straight edges 26 of the pointers 22, 23 intersect the quadrant scale 15. In this case, both of the coordinates (470, 330) are greater than 100, and the paired count is therefore plotted as a point.

*Example 3*

A contractor reports that the reliability of his product is 80%. In field tests, it is found that the product failed 17 times in 71 trials. The question is: should the 80% reliability figure be rejected at the 5% level of significance, or confidence? Setting the cross hairs 33, 24 on the plotted paired count coordinates (55, 17) and (54, 18), it will be found that at the 95% confidence interval, the confidence limits are 85% and 65%. Since the 80% reliability figure falls within the 95% confidence interval, the contractor's reliability figure should be accepted at the 5% level of significance.

*Example 4*

The sign test is used to compare two materials or treatments under various sets of conditions. It is a special case of the comparison of theoretical and observed proportions, where the theoretical proportion is always 50%. The test is then applied to the hypothesis of equality in the materials, by counting the number of positive and negative differences and using these values to compare with 50%.

For instance, the yields of two types of hybrid corn "A" and "B" were compared under various conditions such as different soil types, different fertilizers, and different years with variations of rainfall, temperature, and amounts of sunshine. Out of 8 sets of experiments, there were 6, 5, 3, 2, 4, 3, 3, and 2 pairs of plots available. In 8 out of the 28 pairs of observations, corn "A" yielded higher. Assuming that the yields of both types are theoretically the same, what conclusion can be reached by use of the sign test?

First, the cross hairs 33, 24 of the 95% confidence circular disc are placed on coordinates (20, 8), since 20 is the number of tests in which corn "B" gave the higher yield, and 8 is the number of tests in which corn "A" yielded higher. Next, the lower confidence limit pointer 22 is placed so that its straight edge 26 intersects the quadrant scale 15 at the 50% graduation. Then, placing the cross hairs 33, 24 on coordinates (20, 8), (21, 8) and (20, 9) it will be found that the 50% line falls outside the 95% confidence interval. From this, it can be seen that the hypothesis of equality is rejected at the two-sided significance level of 5%, and hybrid corn "B" has the higher yield.

Using the 99% confidence disc 28', it will be found that the 50% line falls within the 99% confidence limits. By measuring closely from (21, 8) and (20, 7) to the 50% line on the graduations 34 of the circular disc 28', it will be found that the two-sided significance zone is between 1.5% and 4.5%.

*Example 5*

In industrial work, it may be desirable to take the least sample from an unknown population, such that the range from the smallest value in the sample to the largest value in the sample will cover a given fraction of the population with a given confidence. This may be shown to be equivalent to a binomial problem, namely: Find the least sample size from a $q-p$ split ($p=1-q$) such that the second count will be at least 2 with confidence B. If it is desired to use the $r$th from the bottom and the $m$th from the top to establish tolerance limits, replace 2 by $r$ plus $m$.

For instance, a manufacturer of ball bearings wishes to have 99% confidence that 90% of his ball bearings lie between the limits set by the largest and smallest of a sample of a chosen size. To do this, the "split" arm 21 with the 99% circular disc 28' attached is placed on the 90% mark of the quadrant scale 15. The upper confidence limit pointer 23 is removed from the pivot bolt 20, which is then passed through the hole 36, so that the pointer 23 is parallel to the "split" arm 21 and tangent to the circular disc 28'. The intersection of the straight edge 26 of pointer 23 and "2" on the failure scale 14 gives (71, 2). Because the upper confidence limit is obtained by resetting the circular disc 28' on the point of $N+1$ and $S+1$, the desired sample containing the 90% population is $71+1=72$. To this must be added the minumum and maximum, the two bearings which are outside the 90%, to give $72+2=74$, which is the size of the sample required. Therefore, the manufacturer must measure 74 ball bearings before he has 99% confidence that 90% of the ball bearings to be made will measure between the limits set by the largest and smallest of the 74 samples.

These and many other different types of binomial probability statistical work can be performed with the present calculator, as will be readily apparent to those skilled in the art.

Figure 4:
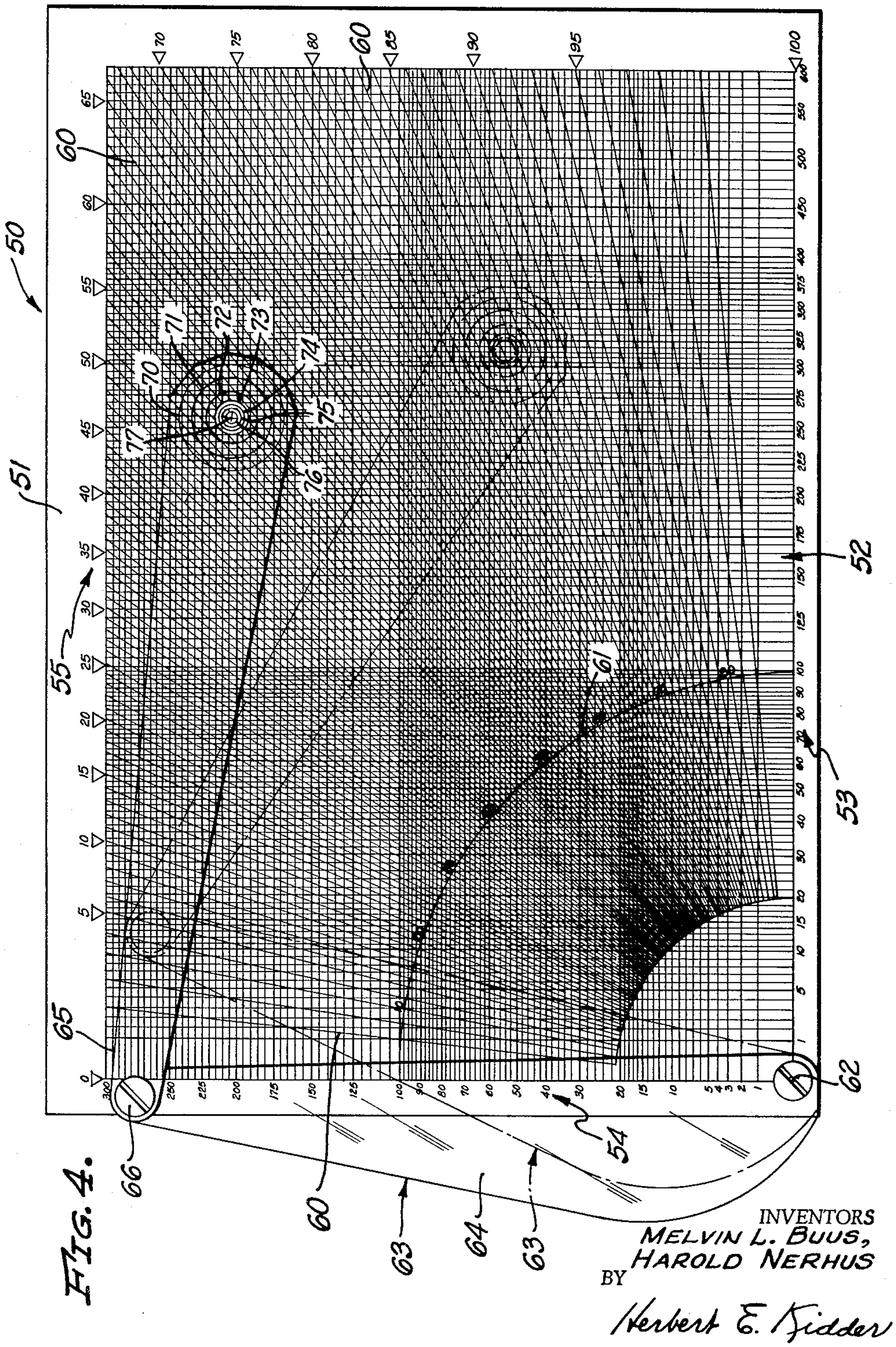
FIGURE 4 is a top plan view of another embodiment of the invention.

A second embodiment of the present invention, illustrated in FIGURE 4, uses the same principles as those involved in the first embodiment but with a somewhat different form of construction. Here, the calculator is designated in its entirety by the reference numeral 50, and is seen to comprise a rectangular board 51 having a square root grid 52 provided thereon. Horizontal scale graduations 53 ranging from zero to 600 are provided along the bottom of the grid 52, representing the number of successes in the sample, while vertical scale graduations 54 ranging from zero to 300 are provided along the left-hand edge of the grid.

Inscribed along the top and right-hand edges of the grid 52 is a percentage scale 55, which ranges from zero at the upper left-hand corner of the square root grid 52, to 100 at the lower right-hand corner thereof. As in the preceding embodiment, the graduations of the percentage scale 55 are such that a straight line through the origin intersects the scale at the percentage of the proportions of the coordinates at all points on the square root grid under the said line. To aid in following a given coordinate out to the percentage grid 55, the square root scale 52 is scribed with a plurality of radial lines 60, all radiating from the origin at the lower left-hand corner of the square root grid. Also scribed on the square root grid 52 is a quarter-circle angle scale 61, graduated from zero to 90 degrees.

Swingably connected to the board 51 by a pivot bolt 62 having its center at the origin of the grid 52, is a jackknife arm 63 comprising two sections 64 and 65 that are joined together by a pivot pin 66. The two arms 64 and 65 are preferably formed of transparent plastic so that the graduations 53 on the grid 52 can be seen through them.

Scribed on the underside of the outer arm section 65 are a plurality of concentric circles 70, 71, 72, 73, 74, 75 and 76 of diminishing diameters, together with a central cross hair 77. The outer four circles 70, 71, 72 and 73 represent 99%, 95%, 90% and 80% confidence circles, respectively, for samples up to the 300 and 600 limits shown on the square root scale graduations 53 and 54, and have radii corresponding to the values shown in the foregoing table. The three inner circles 74, 75 and 76 represent the 99%, 95% and 90% confidence circles for samples up to 3000 and 6000 respectively.

To use this embodiment of the invention, the cross hairs 77 are placed over the paired count coordinates, and the radial lines 60 tangent to the appropriate confidence circle are followed out to the percentage scale 55, to give the upper and lower confidence limits. In this case, the radial lines 60 serve the same function as the straight edges of the pointers 22 and 23 in the first embodiment; the circles 70, 71, 72 and 73 serve the same function as the different size discs 28; and circles 74, 75 and 76 serve the same function as the boss 32 on disc 28.

While we have shown and described in considerable detail two illustrative embodiments of our invention, it will be understood by those skilled in the art that various changes may be made without departing from the scope of the appended claims.

We claim:

1. A binomial probability calculator comprising a plane surface having a square root grid provided thereon, with graduations along the horizontal and vertical axes of said grid representing the number of successes and failures, respectively, of a given sample, a percentage scale provided along the margins of said square root grid opposite the origin thereof, said percentage scale being graduated so that a straight line through the origin of the square root grid will intersect said percentage scale at the percentage value for all coordinates on the square root grid lying under said straight line, and a member movable over the surface of said square root grid and having a circle of radius such that when the center of the circle is placed on a plotted paired count on the square root grid, a straight line passing through the origin of the square root grid and tangent to said circle will intersect said percentage scale at one of the confidence limits of a specified confidence level for the population from which the sample was taken.

2. A binomial probability calculator comprising a plane surface having a square root grid provided thereon, with graduations along the horizontal and vertical axes of said grid representing the number of successes and failures, respectively, of a given sample, a percentage scale provided along the margins of said square root grid opposite the origin thereof, said percentage scale being graduated so that a straight line through the origin of the square root grid will intersect said percentage scale at the percentage value for all coordinates on the square root grid lying under said straight line, and a member movable over the surface of said square root grid and having a circle of radius corresponding to a multiple of the standard deviation for the said square root grid such that when the center of the circle is placed on a plotted paired count on the square root grid, a straight line passing through the origin of the square root grid and tangent to said circle will intersect said percentage scale at one of the confidence limits of the confidence level corresponding to the said multiple of the standard deviation for the population from which the sample was taken.

3. A binomial probability calculator comprising a plane surface having a square root grid provided thereon, with graduations along the horizontal and vertical axes of said grid representing the number of successes and failures, respectively, of a given sample, a percentage scale provided along the margins of said square root grid opposite the origin thereof, said percentage scale being graduated so that a straight line through the origin of the square root grid will intersect said percentage scale at the percentage value for all coordinates on the square root grid lying under said straight line, and a member movable over the surface of said square root grid and having a circle of radius such that when the center of the circle is placed on a plotted paired count on the square root grid, a straight line passing through the origin of the square root grid and tangent to said circle on one side thereof will intersect said percentage scale at one of the confidence limits of a specified confidence level, and means for projecting straight lines from said origin of said square root grid tangent to said circle on opposite sides thereof and intersecting said percentage scale, the intersection of said projected straight lines being the confidence limits of a specified confidence level, and the percentage range between said lines being the confidence interval.

4. A binomial probability calculator comprising a plane surface having a square root grid provided thereon, with graduations along the horizontal and vertical axes of said grid representing the number of successes and failures, respectively, of a given sample, a percentage scale provided along the margins of said square root grid opposite the origin thereof, said percentage scale being graduated so that a straight line through the origin of the square root grid will intersect said percentage scale at the percentage value for all coordinates on the square root grid lying under said straight line, and a member movable over the surface of said square root grid and having a circle of radius equal to a multiple of the standard deviation for said square root grid corresponding to a specified confidence level, whereby when the center of the circle is placed on a plotted paired count on the square root grid, a straight line passing through the origin of the square root grid and tangent to said circle on one side thereof will intersect said percentage scale at one of the confidence limits of said specified confidence level, and means for projecting straight lines from said origin of said square root grid tangent to said circle on oppoiste sides thereof and intersecting said percentage scale, the intersection of said projected straight lines being the confidence limits of said specified confidence level, and the percentage range between said lines being the confidence interval.

5. A binomial probability calculator comprising a plane surface having a square root grid provided thereon, with graduations along the horizontal and vertical axes of said grid representing the number of successes and failures, respectively, of a given sample, a percentage scale provided along the margin of said square root grid opposite the origin thereof, said percentage scale being graduated so that a straight line through the origin of the square root grid will intersect said percentage scale at the percentage value for all coordinates on the square root grid lying under said straight line, and a transparent member resting upon and supported for sliding movement over the surface of said square root grid, said transparent member having a circle with cross hairs at the center thereof, said circle being of a radius such that when said cross hairs are placed over a plotted paired count on the square root grid, a straight line passing through the origin of the square root grid and tangent to said circle will intersect said percentage scale at one of the confidence limits of a specified confidence level, and means for obtaining intersection points on said percentage scale which lie on straight line passing through the origin of said square root grid and tangent to said circle on opposite sides thereof.

6. A binomial probability calculator comprising a plane surface having a square root grid provided thereon, with graduations along the horizontal and vertical axes of said grid representing the number of successes and failures, respectively, of a given sample, a percentage scale provided along the margins of said square root grid opposite the origin thereof, said percentage scale being graduated so that a straight line through the origin of the square root grid will intersect said percentage scale at the percentage value for all coordinates on the square root grid lying under said straight line, an arm pivoted for swinging movement in the plane of said surface about a center at the origin of said square root grid, a circular disc slidably supported on said arm, said disc being of a radius corresponding to a multiple of the standard deviation of said square root grid corresponding to a specified confidence level, and a pair of pointers pivoted for swinging movement about the origin of said square root grid as a center, each of said pointers having a straight edge passing through said origin and lying tangent to said circular disc on opposite sides thereof, said straight edges of said pointers intersecting said percentage scale at the confidence limits for said specified confidence interval.

7. A binomial probability calculator comprising a plate having a square root grid provided thereon, with graduations along the horizontal and vertical axes representing the number of successes and failures respectively, of a given sample, a pivot center located at the origin of said square root grid, a quadrant scale on said plate having its center at said pivot center, said quadrant scale being graduated in percentages corresponding to the proportions of the coordinates on the square root grid lying under a straight line drawn through the origin thereof, an arm pivoted on said pivot center for swinging movement across the face of said plate, said arm having a straight line extending radially from said pivot center and being divided into square root scale graduations representing the number of units in the sample, a circular disc slidable lengthwise along said arm to a position thereon corresponding to the number of units in said sample, a pair of pointers pivoted on said pivot center and lying on opposite sides of said arm, each of said pointers having a straight edge extending radially from said pivot center and tangent to said disc on opposite sides thereof, said straight edges intersecting said quadrant scale, said disc being of a radius such that the intersection of said straight edges on said pointers with said quadrant scale gives the percentage values for the upper and lower confidence limits at a specified confidence level, the range between said confidence limits being the confidence interval.

8. A binomial probability calculator as defined in claim 7, wherein said arm and said circular disc are made of transparent material so that the graduations of said square root grid can be seen through them.

9. A binomial probability calculator as defined in claim 1, wherein said member has a second circle concentric with said first-named circle, the diameter of said second circle being reduced by a factor of 3.16 from the diameter of said first-named circle, whereby said second circle can be used to find confidence limits for samples up to ten times the size of the limits on said square root scale.

10. A binomial probability calculator as defined in claim 1, wherein said circle is of a radius equal to 2.58 standard deviations for the said square root grid, whereby a straight line passing through the origin of the square root grid and tangent to said circle will intersect said percentage scale at one of the confidence limits of the 99% confidence level.

11. A binomial probability calculator as defined in claim 1, wherein said circle is of a radius equal to 1.96 standard deviations for the said square root grid, whereby a straight line passing through the origin of the square root grid and tangent to said circle will intersect said percentage scale at one of the confidence limits of the 95% confidence level.

12. A binomial probability calculator as defined in claim 1, wherein said circle is of a radius equal to 1.65 standard deviations for the said square root grid, whereby a straight line passing through the origin of the square root grid and tangent to said circle will intersect said percentage scale at one of the confidence limits of the 90% confidence level.

13. A binomial probability calculator as defined in claim 1, wherein said circle is of a radius equal to 1.28 standard deviations for the said square root grid, whereby a straight line passing through the origin of the square root grid and tangent to said circle will intersect said percentage scale at one of the confidence limits of the 80% confidence level.

14. A binomial probability calculator as defined in claim 1, wherein said circle is of a radius equal to .97 standard deviations for the square root grid, whereby a straight line passing through the origin of the square root grid and tangent to said circle will intersect said percentage scale at one of the confidence limits of the 67% confidence level.

No references cited.